US009952810B2

(12) United States Patent
Hakozaki

(10) Patent No.: US 9,952,810 B2
(45) Date of Patent: Apr. 24, 2018

(54) INFORMATION PROCESSING SYSTEM, INFORMATION PROCESSING APPARATUS, AND INFORMATION PROCESSING METHOD

(71) Applicant: Hironori Hakozaki, Tokyo (JP)

(72) Inventor: Hironori Hakozaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/707,140

(22) Filed: May 8, 2015

(65) Prior Publication Data
US 2015/0339086 A1 Nov. 26, 2015

(30) Foreign Application Priority Data

May 21, 2014 (JP) ................................ 2014-104950

(51) Int. Cl.
*G06F 3/12* (2006.01)

(52) U.S. Cl.
CPC .......... *G06F 3/1237* (2013.01); *G06F 3/1204* (2013.01); *G06F 3/1267* (2013.01); *G06F 3/1273* (2013.01); *G06F 3/1285* (2013.01); *G06F 3/1288* (2013.01)

(58) Field of Classification Search
None
See application file for complete search history.

(56) References Cited

U.S. PATENT DOCUMENTS

2002/0026636 A1* 2/2002 LeComte ............. H04N 5/4401
725/31
2005/0283461 A1* 12/2005 Sell ...................... G06Q 10/107
(Continued)

FOREIGN PATENT DOCUMENTS

EP          2523092         11/2012
JP       2006-099714        4/2006
(Continued)

OTHER PUBLICATIONS

Extended European Search Report dated Oct. 27, 2015.
Japanese Office Action for 2014-104950 dated Jan. 16, 2018.

*Primary Examiner* — Fan Zhang
(74) *Attorney, Agent, or Firm* — IPUSA, PLLC

(57) ABSTRACT

An information processing system includes a plurality of information processing apparatuses and a storage apparatus that stores user identification information of a user in association with identification information of at least one of the information processing apparatuses that stores bibliographic information of output data associated with the user. Each of the information processing apparatuses includes a receiving unit that receives output data to be output by a device; a storage unit that stores the received output data and corresponding bibliographic information in association with user identification information of a user; an information acquisition unit that acquires from the storage unit of the information processing apparatus that is associated with the user that is using the device in the storage apparatus, the corresponding bibliographic information associated with the user identification information of the user; and a first transmitting unit that transmits the acquired bibliographic information to the device.

17 Claims, 13 Drawing Sheets

(56) References Cited

U.S. PATENT DOCUMENTS

| | | | |
|---|---|---|---|
| 2010/0253964 A1* | 10/2010 | Isshiki | G06F 3/1203 |
| | | | 358/1.14 |
| 2013/0033714 A1 | 2/2013 | Nakagawa | |
| 2013/0120784 A1 | 5/2013 | Takagi | |
| 2013/0212163 A1* | 8/2013 | Shimomoto | H04N 1/00225 |
| | | | 709/203 |
| 2015/0293734 A1* | 10/2015 | Shirai | G06F 3/1259 |
| | | | 358/1.15 |

FOREIGN PATENT DOCUMENTS

| | | | |
|---|---|---|---|
| JP | 2006099714 | * | 4/2006 |
| JP | 2010-061536 | | 3/2010 |
| JP | 2012-238110 | | 12/2012 |
| JP | 2013-050935 | | 3/2013 |
| JP | 2013-092869 | | 5/2013 |

* cited by examiner

FIG.5

| USER ID |
|---|
| DOCUMENT NAME |
| DRIVER NAME |
| CLIENT MACHINE NAME |
| INPUT DATE/TIME |
| DATA SIZE (BYTE) |
| IP ADDRESS |
| FILE PATH NAME |
| NUMBER OF PAGES |
| PRINT SIDE INFORMATION (1 SIDE/2 SIDES) |
| COLOR INFORMATION (MONOCHROME/COLOR) |
| PAGE LAYOUT (2 IN 1, 4 IN 1, ⋯) |
| NUMBER OF COPIES |
| PUNCH SETTING |
| STAPLE SETTING |

FIG.7

| USER ID | SITE SERVER ID |
|---------|----------------|
| USER A | SERVER A(2), SERVER B(1) |
| USER B | SERVER B(1) |
| USER C | SERVER A(1) |
| USER D | SERVER C(2) |
| USER E | SERVER A(3) |

422

INFORMATION PROCESSING SYSTEM, INFORMATION PROCESSING APPARATUS, AND INFORMATION PROCESSING METHOD

BACKGROUND OF THE INVENTION

1. Field of the Invention

The present invention relates to an information processing system, an information processing apparatus, and an information processing method.

2. Description of the Related Art

Pull printing is a printing technique that enables a user to use a PC (Personal Computer) or the like to transmit print data to a predetermined server. The server stores such print data. Then, in response to an operation by the user of an image forming apparatus having the predetermined server set up as a reference destination server, the image forming apparatus acquires (pulls) the print data stored in the predetermined server and executes a print job based on the print data (see e.g., Japanese Laid-Open Patent Publication No. 2006-099714). In pull printing, a print job may be executed when the user is near the image forming apparatus, and in this way, printed paper containing confidential information or the like may be prevented from being left abandoned or exposed to others, for example. Also, in pull printing, a print job relating to the same print data may be executed by any one of a plurality of image forming apparatuses having the same server set up as a reference destination server, for example.

However, in conventional pull printing, it is difficult to enable sharing of print data across image forming apparatuses having different servers set up as their reference destination servers. For example, assuming "user a" registers print data in "server A" corresponding to a reference destination server for one or more image forming apparatuses installed in an office where "user a" works, "user a" may be able to execute a print job relating to the print data using any of the image forming apparatuses located within the office of "user a". On the other hand, when "user a" visits another office having image forming apparatuses designating "server B" as the reference destination server, "user a" may not be able to execute a print job relating to the print data registered in "server A" using the image forming apparatuses located within the other office.

SUMMARY OF THE INVENTION

An aspect of the present invention relates to improving interoperability of data stored in a storage apparatus as output target data to be output by a device.

According to one embodiment of the present invention, an information processing system is provided that includes a plurality of information processing apparatuses and a storage apparatus configured to store user identification information of a user in association with identification information of at least one of the information processing apparatuses that stores bibliographic information of output data associated with the user. Each of the information processing apparatuses includes a receiving unit configured to receive via a network, output data to be output by a device; a storage unit configured to store the output data received by the receiving unit and corresponding bibliographic information of the received output data in association with user identification information of a corresponding user; an information acquisition unit configured to acquire from the storage unit of the at least one of the information processing apparatuses that is associated with the user that is using the device in the storage apparatus, the corresponding bibliographic information associated with the user identification information of the user that is using the device, in response to a request from the device; and a first transmitting unit configured to transmit the corresponding bibliographic information acquired by the information acquisition unit to the device.

BRIEF DESCRIPTION OF THE DRAWINGS

FIG. 5 illustrates an exemplary configuration of bibliographic information;

FIG. 7 illustrates an exemplary configuration of a storage information storage unit;

DESCRIPTION OF THE PREFERRED EMBODIMENTS

In the following, embodiments of the present invention are described with reference to the accompanying drawings.

Figure 1:
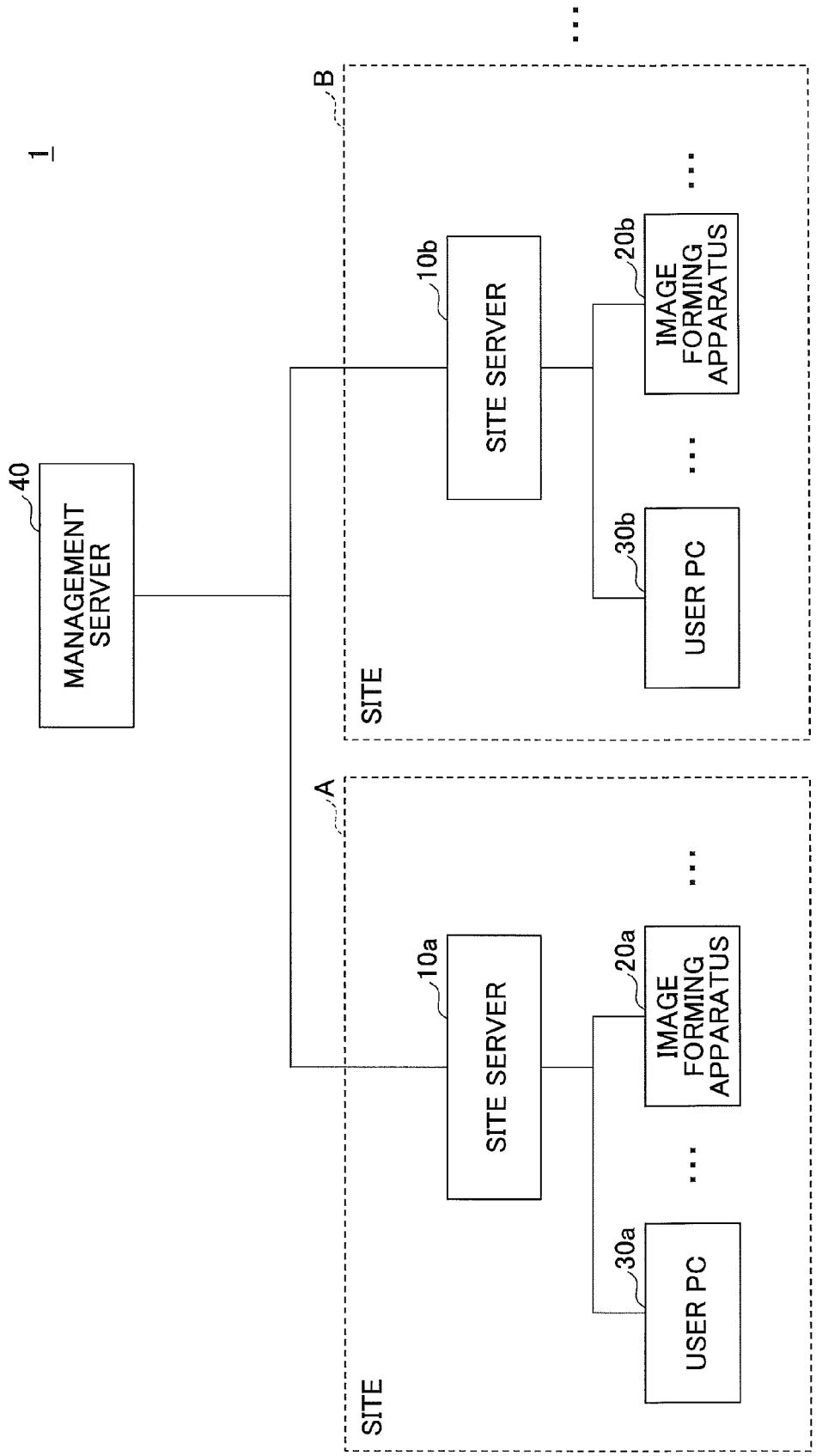
FIG. 1 illustrates an exemplary configuration of a print system according to a first embodiment of the present invention.

FIG. 1 illustrates an exemplary configuration of a print system 1 according to a first embodiment of the present invention. The print system 1 of FIG. 1 includes a plurality of sites such as site A and site B that may correspond to regional offices, branch offices, or other operating bases of a business organization and the like. For example, site A may correspond an office located in Japan and site B may correspond to an office located in the United States. Note that the print system 1 may include three or more sites. Also, note that in FIG. 1, "a" is attached at the end of reference numerals of devices belonging to site A, and "b" is attached at the end of the reference numerals of devices belonging to site B. Note that in the following descriptions, when referring to the devices installed in site A and site B, the symbols "a" and "b" attached at the end of the references numerals of the devices may be omitted in the case where their differences are not particularly relevant.

Each site includes a site server 10, at least one user PC (personal computer) 30, and at least one image forming apparatus 20 that are interconnected via a network such as a LAN (local area network) or the Internet. That is, each site server 10 is associated with a different group of one or more image forming apparatuses 20.

The user PC 30 may be a personal computer used by a user at a corresponding site to conduct business operations, for example. In the present embodiment, the user PC 30 transmits print data to the site server 10 belonging to the same site as the user PC 30. Note that in some embodiments, a mobile phone, a smartphone, a tablet terminal, or some other device may be used instead of the user PC 30, for example.

The site server 10 is a computer that receives print data transmitted from the user PC 30 and stores the print data and corresponding bibliographic information of the print data. In the present embodiment, one site server 10 is provided at each site. However, in some embodiments, more than one site server 10 may be provided within a single site. Note that in the following descriptions, bibliographic information of print data may simply be referred to as "bibliographic information".

The image forming apparatus 20 may be a multifunction peripheral (MFP), a printer, or some other device having a printing function. In response to a user operation, the image forming apparatus 20 transmits an acquisition request for bibliographic information and print data to the site server 10 belonging to the same site as the image forming apparatus 20 and executes a print job based on print data that is returned in response to the acquisition request. That is, address information of the site server 10 belonging to the same site as the image forming apparatus 20 is set up in advance in the image forming apparatus 20 as the acquisition destination of bibliographic information and print data.

Note that in some embodiments, the site server 10 may also store image data that is scanned by the image forming apparatus 20. In this case, the site server may acquire (receive) information including the scanned image data from the image forming apparatus 20 and store the acquired information as print data.

The management server 40 is a computer that is connected to a plurality of site servers 10 that are located at a plurality of sites via a network such as a LAN or the Internet. The management server 40 executes processes for achieving interoperability of bibliographic information and print data across multiple site servers. That is, the management server 40 may enable the image forming apparatus 20*a* located at site A to execute a print job based on print data stored in the site server 10*b* that is located at site B, for example.

Note that in some embodiments, the print system 1 may include more than one management server 40. For example, one management server 40 may be provided with respect to every predetermined number of sites. Also, in some embodiments, the management server 40 may belong to one of the plurality of sites. For example, one of the site servers 10 may act as the management server 40 for managing the other site servers 10.

Figure 2:
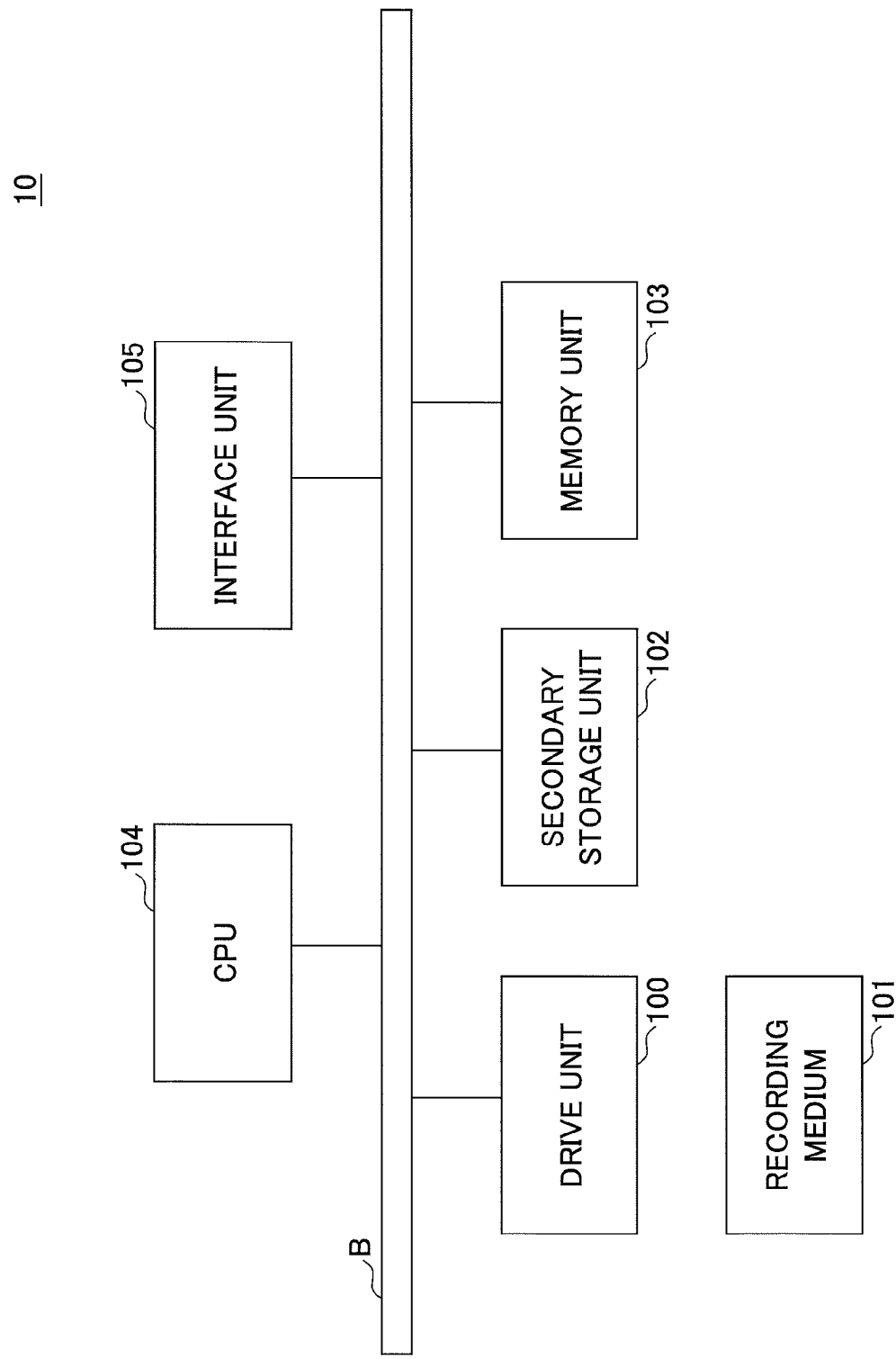
FIG. 2 illustrates an exemplary hardware configuration of a site server.

FIG. 2 illustrates an exemplary hardware configuration of the site server 10 according to the present embodiment. In FIG. 2, the site server 10 includes a drive unit 100, a secondary storage unit 102, a memory unit 103, a CPU (central processing unit) 104, and an interface unit 105 that are interconnected by a bus B.

A program for executing a process at the site server 10 may be provided by a recording medium 101 such as a CD-ROM. When the recording medium 101 storing the program is loaded into the drive unit 100, the program may be installed on the secondary storage unit 102 from the recording medium 101 via the drive unit 100. The program, however, does not necessarily have to be installed from the recording medium 101, and may alternatively be downloaded from some other computer via a network, for example. The secondary storage unit 102 stores files and data in addition to installed programs.

The memory unit 103 reads a program from the secondary storage unit 102 and stores the read program in response to an instruction to activate the program. The CPU 104 implements a function of the site server 10 by executing a relevant program stored in the memory unit 103. The interface unit 105 is used as an interface for establishing connection with a network.

Note that in some embodiments, the site server 10 may be configured by a computer system including a plurality of computers having hardware configurations as illustrated in FIG. 2, for example. Also, the management server 40 may have a hardware configuration similar to that of the site server 10, for example.

Figure 3:
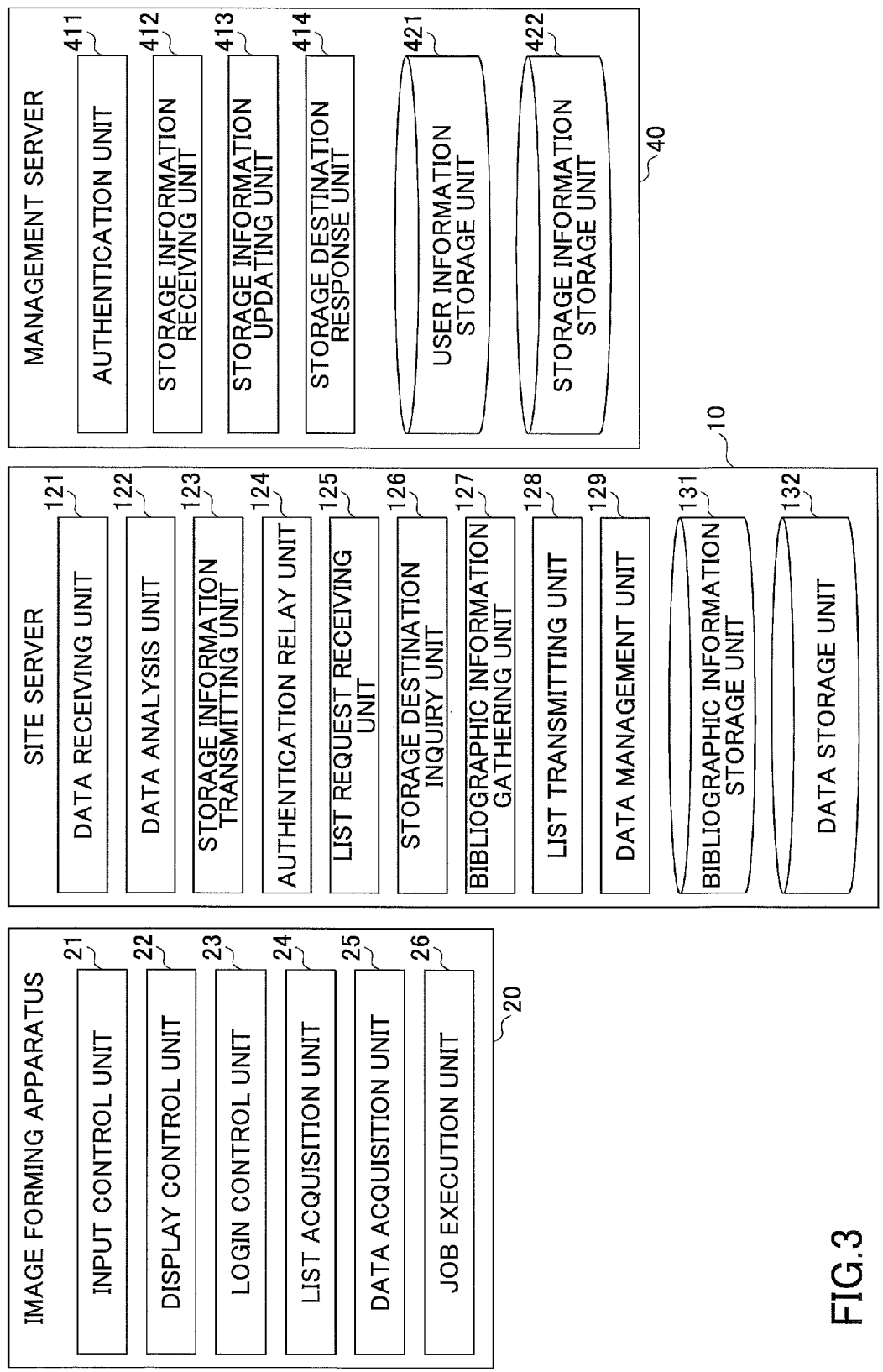
FIG. 3 illustrates an exemplary functional configuration of the print system according to the first embodiment.

FIG. 3 illustrates an exemplary functional configuration of the print system 1 according to the present embodiment. In FIG. 3, the image forming apparatus 20 includes an input control unit 21, a display control unit 22, a login control unit 23, a list acquisition unit 24, a data acquisition unit 25, and a job execution unit 26. These units may be implemented by relevant processes that are executed by a CPU of the image forming apparatus 20 based on at least one program installed on the image forming apparatus 20, for example.

The input control unit 21 interprets a user instruction that is input via an operation panel of the image forming apparatus 20, for example. The display control unit 22 controls the operation panel to display information generated during execution of a process by the image forming apparatus 20. The login control unit 23 controls a login process for enabling a user to log into the image forming apparatus 20.

The list acquisition unit 24 acquires a list of bibliographic information (hereinafter referred to as "bibliographic list") associated with a login user from the site server 10 that is set up in the image forming apparatus 20 as an inquiry destination for the image forming apparatus 20.

The data acquisition unit 25 acquires (downloads) corresponding print data that is associated with bibliographic information selected by a user from the bibliographic list displayed on the operation panel. The bibliographic information includes address information indicating the storage destination of the corresponding print data associated with the bibliographic information. The data acquisition unit 25 acquires the corresponding print data based on the address information included in the bibliographic information. The print data may be data in the PDL (Page Description Language) format or any other data format that may be used to plot a print image upon executing a print job. In general, the data size of the print data is greater than the data size of the bibliographic information. Therefore, in the present embodiment, print data that is selected by a user for printing is downloaded to the image forming apparatus 20. However, in some embodiments, print data associated with each item of bibliographic information included in the bibliographic list may be transferred over a network along with the bibliographic list, for example.

The job execution unit 26 controls printing of the print data acquired by the data acquisition unit 25.

The site server 10 includes a data receiving unit 121, a data analysis unit 122, a storage information transmitting unit 123, an authentication relay unit 124, a list request receiving unit 125, a storage destination inquiry unit 126, a bibliographic information gathering unit 127, a list transmitting unit 128, and a data management unit 129. These units may be implemented by relevant processes that are executed by the CPU 104 of the site server 10 based on at least one program installed on the site server 10, for example. The site server 10 also includes a bibliographic information storage unit 131 and a data storage unit 132. These storage units may be implemented by the secondary storage device 102, for example. Alternatively, these storage units may be implemented by a storage device that is connected to the site server 10 via a network, for example.

The data receiving unit 121 receives print data from the user PC 30, for example. The data receiving unit 121 stores the received print data in the data storage unit 132. The data analysis unit 122 generates bibliographic information by analyzing the print data. The data analysis unit 122 stores the generated bibliographic information in the bibliographic information storage unit 131 in association with the corresponding print data. The storage information transmitting unit 123 transmits a user ID of the user associated with the print data received by the data receiving unit 121 and identification information of the present site server (hereinafter referred to as "site server ID") to the management server 40. That is, the storage information transmitting unit 123 notifies the management server 40 that the print data submitted by the user identified by the user ID and the corresponding bibliographic information of the print data are stored in the present site server 10. Also, when bibliographic information and print data stored in the bibliographic information storage unit 131 and the data storage unit 132 are deleted, the storage information transmitting unit 123 transmits the site server ID of the present site server 10 and the user ID of the user associated with the deleted bibliographic information and print data to the management server 40. That is, the storage information transmitting unit 123 notifies the management server 40 that the print data and the bibliographic information associated with the user identified by the user ID have been deleted. Note that in the following descriptions, information such as the user ID and the site server ID transmitted by the storage information transmitting unit 123 is referred to as "storage information."

The authentication relay unit 124 forwards an authentication request that is transmitted from the image forming apparatus 20 to the management server 40 for authenticating a user that is attempting to login to the image forming apparatus 20. The authentication relay unit 124 also forwards a response to the authentication request from the management server 40 to the image forming apparatus 20. Note that in some embodiments, information stored in the user information storage unit 421 of the management server 40 may be cached on each site server 10. In this case, the authentication relay unit 124 may perform an authentication process in place of the management server 40 based on the cached information, for example. Note that a user ID and a password may be used as authentication information for authenticating a user, for example. Alternatively, a card ID or biological information may be used as the authentication information, for example.

The list request receiving unit 125 receives from the image forming apparatus 20 a bibliographic list acquisition request for acquiring a list of bibliographic information associated with a login user of the image forming apparatus 20. The storage destination inquiry unit 126 makes an inquiry to the management server 40 about the site server 10 corresponding to the storage destination of the bibliographic information associated with the login user specified in the bibliographic information acquisition request. That is, the management server 40 manages information on each site server 10 that stores bibliographic information and print data associated with each user based on the storage information received from each of the site servers 10 of the print system 1. The bibliographic information gathering unit 127 gathers bibliographic information associated with the user specified in the bibliographic list acquisition request from the present site server 10 or another site server 10 based on an inquiry result obtained by the storage destination inquiry unit 126. The list transmitting unit 128 transmits a bibliographic list including the bibliographic information that has been gathered by the bibliographic information gathering unit 127 to the image forming apparatus 20 corresponding to the sender of the bibliographic list acquisition request. The data management unit 129 acquires print data from the data storage unit 132 according to a data acquisition request for print data associated with bibliographic information selected from the bibliographic list. The data management unit 129 transmits the acquired print data to the image forming apparatus 20 corresponding to the sender of the data acquisition request.

The management server 40 includes an authentication unit 411, a storage information receiving unit 412, a storage information updating unit 413, and a storage destination response unit 414. These units may be implemented by relevant processes that are executed by a CPU of the management server 40 based on at least one program installed on the management server 40, for example. The management server 40 also includes a user information storage unit 421 and a storage information storage unit 422. These storage units may be implemented by a secondary storage device of the management server 40, for example. Alternatively, these storage units may be implemented using a storage device that is connected to the management server 40 via a network, for example.

The authentication unit 411 performs an authentication process in response to an authentication request from the authentication relay unit 124 of the site server 10. In the authentication process, the authentication unit 411 may refer to the user information storage unit 421. The user information storage unit 421 stores user information including information to be compared with authentication information and attribute information of each user, for example.

The storage information receiving unit 412 receives the storage information transmitted from the storage information transmitting unit 123 of the site server 10. The storage information updating unit 413 updates the information stored in the storage information storage unit 422 based on the received storage information. The storage information storage unit 422 stores, in association with each user ID, the site server ID of the site server 10 corresponding to the storage destination of the bibliographic information and the print data associated with the user identified by the user ID.

The storage destination response unit 414 responds to an inquiry request from the storage destination inquiry unit 126 of the site server 10 by transmitting a list of site server IDs stored in the storage information storage unit 422 in association with the user ID included in the inquiry request.

Figure 4:
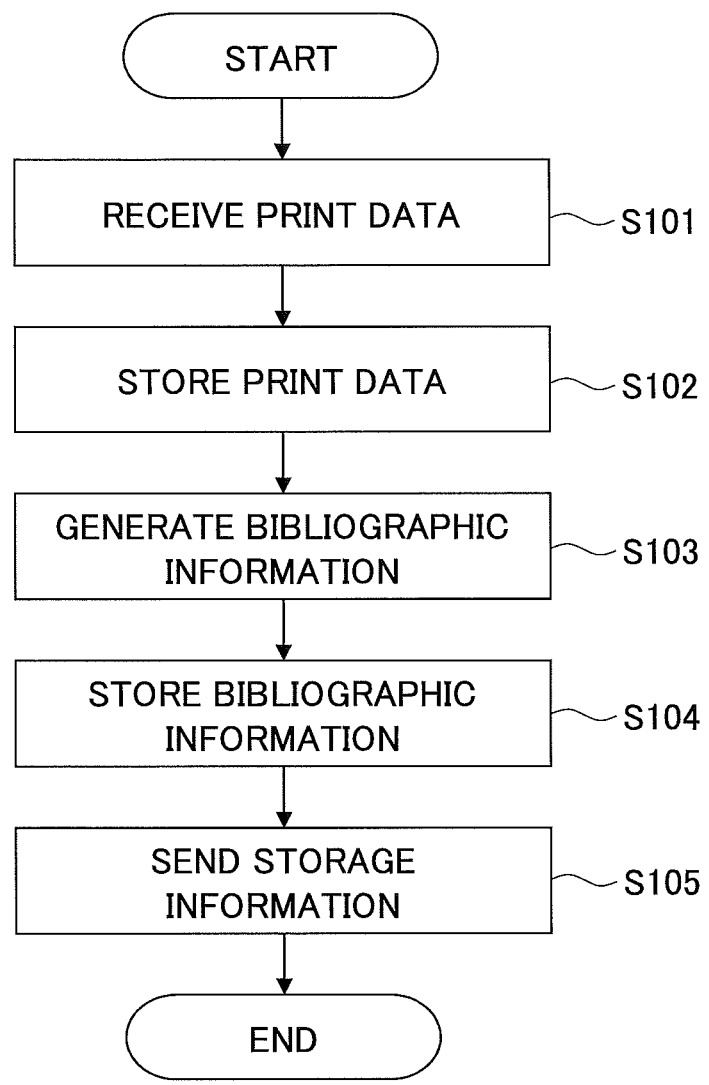
FIG. 4 is a flowchart illustrating exemplary process steps executed by the site server in response to receiving print data.

In the following, process operations that are executed in the printing system 1 are described. FIG. 4 is a flowchart illustrating exemplary process steps that are executed when the site server 10 receives print data. In the following descriptions of the process of FIG. 4, for convenience, process steps that are executed within site A are described as an example. In the case where the process of FIG. 4 is executed at another site, a user PC 30 and a site server 10 located within the other site may execute the process steps described below instead of the user PC 30a and the site server 10a located within site A.

In step S101, the data receiving unit 121 of the site server 10a receives print data transmitted from any given one of the user PCs 30a located within site A. Then, the data receiving unit 121 stores the received print data in the data storage unit 132 (step S102). Then, the data analysis unit 122 generates corresponding bibliographic information of the print data (step S103).

FIG. 5 is a table illustrating an exemplary configuration of bibliographic information. In FIG. 5, the bibliographic information includes a user ID, a document name, a driver name, a client machine name, an input date/time, a data size, an IP address, a file path, a number of pages, print side information, color information, page layout information, a number of copies, a punch setting, and a staple setting.

The user ID is identification information of the user that has issued an operation instruction such as a print instruction via the user PC 30a. The document name is the name of the document data corresponding to the print data. The driver name is the name of a printer driver that generates print data. The client machine name is the name (host name) of the user PC 30a corresponding to the sender of the print data. The input data/time is the date/time the print data was received. The data size is the data size of the print data. The IP address is the IP address of the site server 10a corresponding to the storage destination of the print data. The file path name is the path name of the storage destination of the print data. Note that a combination of the IP address and the file path name is an example of address information of the bibliographic information of the print data. That is, the print data may be uniquely identified across different sites based on the combination of the IP address and the file path name. Note that in some embodiments, other types of address information such as a URL (Uniform Resource Locator) may be included in the bibliographic information in place of the IP address and the file path name, for example.

Note that the number of pages and the information items listed below the number of pages in FIG. 5 correspond to setting information related to the print job for the print data. The number of pages is information indicating the number of pages to be printed. The print side information is information indicating whether 1-side printing or 2-side printing is to be implemented. The color information is information indicating whether monochrome printing or color printing is to be implemented. The page layout information is information related to the page layout; namely, whether multiple pages are to be printed on a single sheet such as 2-in-1 or 4-in-1, for example. The number of copies is information indicating the number of copies to be printed. The punch setting is setting information relating to punching. The staple setting is setting information related to stapling.

Note that information items other than the input date/time, the IP address, and the file path name may be extracted from the print data, for example. The file path name may be determined upon executing step S102.

Then, the data analysis unit 122 stores the generated bibliographic information in the bibliographic information storage unit 131 (step S104). In the present embodiment, the print data and the bibliographic information are associated with each other based on the file path name included in the bibliographic information. However, the print data and the bibliographic information may be associated in other ways.

Then, the storage information transmitting unit 123 transmits to the management server 40 storage information including the user ID specified in the bibliographic information, the site server ID of the site server 10a, and information "store" indicating that the corresponding storage information relates to storage of print data and corresponding bibliographic information (S105). Note that in the present embodiment, the storage information transmitting unit 123 transmits the storage information in step S105 even in a case where storage information including the same user ID has already been transmitted to the management server 40 upon storing other print data associated with the user ID that has been received earlier and such storage information is currently still stored in the management server 40. In other words, the storage information transmitting unit 123 transmits the storage information without checking whether the storage information is a duplicate of storage information that is already stored in the management server 40.

Figure 6:
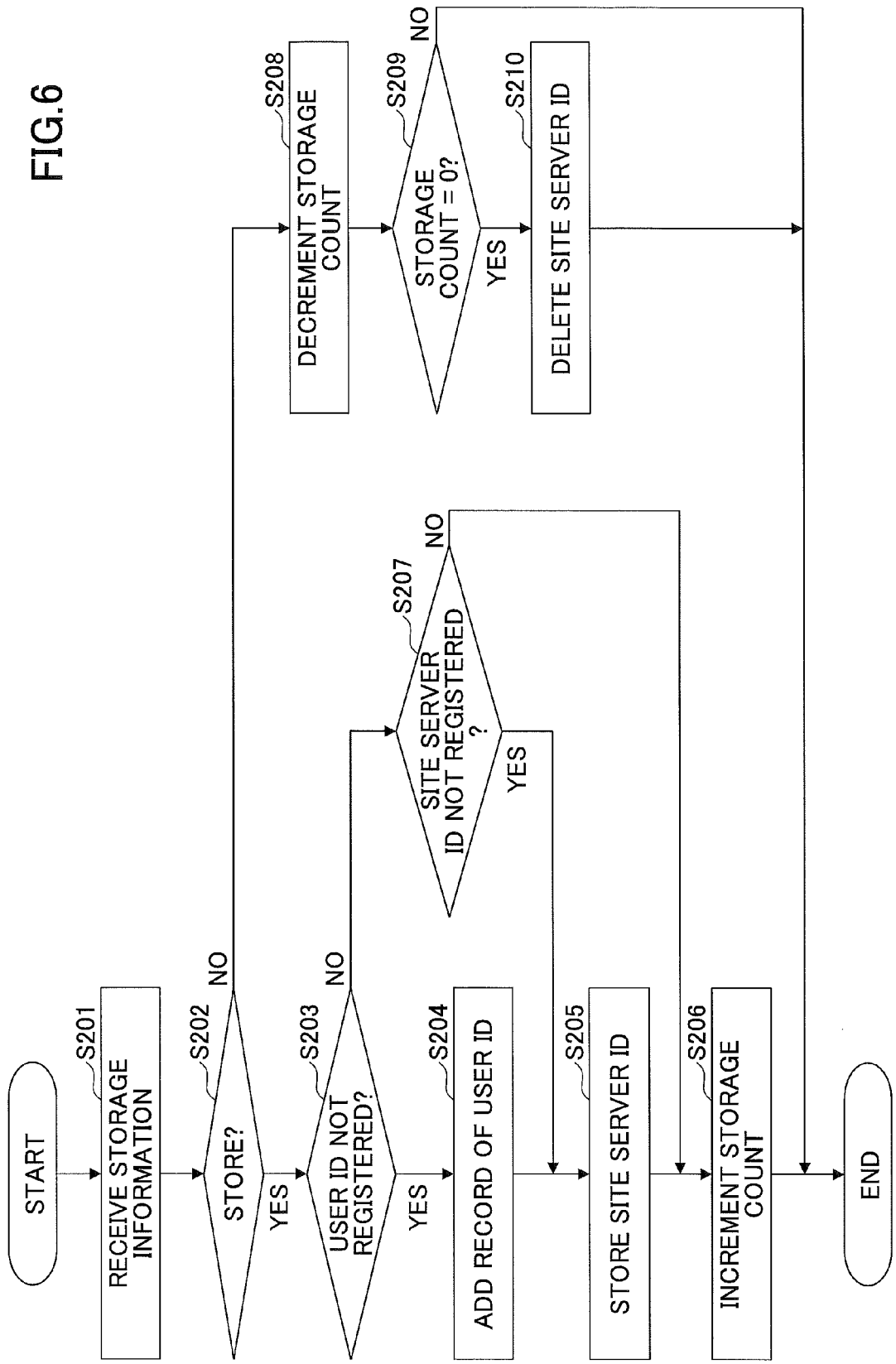
FIG. 6 is a flowchart illustrating exemplary process steps executed by a management server in response to receiving storage information.

In the following, process steps executed by the management server 40 in response to receiving the storage information from the site server 10 are described. FIG. 6 is a flowchart illustrating exemplary process steps that are executed by the management server 40 upon receiving storage information according to the present embodiment.

In step S201, the storage information receiving unit 412 receives the storage information transmitted from one of the site servers 10. Then, the storage information updating unit 413 determines whether the storage information includes the information "delete" or "store" indicating deletion or storage of print data and corresponding bibliographic information (step S202). If the storage information includes the information "store" (YES in step S202), the storage information updating unit 413 determines whether a record corresponding to the user ID included in the received storage information is registered in the storage information storage unit 422 (step S203).

FIG. 7 is a diagram showing an exemplary configuration of the storage information storage unit 422. In FIG. 7, the storage information storage unit 422 stores, in association with each user ID, one or more site server IDs of the site servers 10 storing bibliographic information and print data associated with the user identified by the corresponding user ID.

In FIG. 7, bibliographic information and print data that are associated with "user A" are stored in two site servers 10 that are identified by the site server IDs "server A" and "server B". Note that the numbers within parentheses indicated after the site server IDs in FIG. 7 represent the storage count of print data and bibliographic information stored in association with the user identified by the corresponding user ID within the site server 10 identified by the corresponding site server ID. For example, "server A" stores 2 sets of print data that are associated with "user A".

If there is no record corresponding to the user ID that is included in the received storage information (YES in step S203), the storage information updating unit 413 adds a record corresponding to the user ID to the storage information storage unit 422 (step S204). Then, the storage information updating unit 413 stores the site server ID included in the received storage information in the record (step S205). Then, the storage information updating unit 413 adds 1 to the storage count for the corresponding site server ID in the record (step S206). Note that in the case where step S206 is executed after step S205, the storage count is set to "1".

On the other hand, if there is a record corresponding to the user ID that is included in the received storage information (NO in step S203), the storage information updating unit 413 determines whether the site server ID included in the received storage information is registered in the record (step S207). If the site server ID included in the received storage information is not registered in the record (YES in step S207), the storage information updating unit 413 registers the site server ID in the record (step S205). Then, step S206 is executed. If the site server ID is registered in the record (NO in step S207), the storage information updating unit 413 adds 1 to the storage count for the site server ID in the record (step S206).

If the received storage information includes the information "delete" (NO in step S202), the storage information updating unit 413 identifies the record in the storage information storage unit 422 corresponding to the user ID that is included in the received storage information and the corresponding storage count for the site server ID that is included in the received storage information, and subtracts 1 from the corresponding storage count within the identified record (step S208). Then, the storage information updating unit 413 determines whether the corresponding storage count for the site server ID has become 0 (step S209). If the storage count has become 0 (YES in step S209), the storage information updating unit 413 deletes the site server ID from the record (step S210). Note that print data and bibliographic information may be deleted when a print job for the print data has been executed, for example. Also, in some embodiments, deletion of bibliographic information and print data may be enabled by a management tool, for example. When bibliographic information and print data are deleted in this manner, for example, the storage information transmitting unit 123 of the site server 10 transmits the storage information including the information "delete" to the management server 40.

Note that in some embodiments, in step S105 of FIG. 4, the storage information transmitting unit 123 may be configured to refrain from performing redundant transmission of storage information. For example, when print data is newly stored in the site server 10, the storage information transmitting unit 123 may refrain from transmitting corresponding storage information including the information "store" to the management server 40 if print data associated with the same user ID as that associated with the newly stored print data is already stored in the site server 10. Also, when print data and bibliographic information are deleted from the site server 10, the storage information transmitting unit 123 may refrain from transmitting corresponding storage information including the information "delete" to the management server 40 if other print data and bibliographic information associated with the same user ID as that associated with the deleted print data and bibliographic information are still stored in the site server 10, for example. That is, the storage information transmitting unit 123 may be configured to transmit the storage information including the information "delete" when no other print data and bibliographic information associated with the corresponding user ID is stored in the site server 10, for example.

Note that in the case where redundant transmission of the storage information is eliminated at the site server 10, the storage information storage unit 422 of the management server 40 may not have to store the storage count for each site server ID. In this case, when storage information including the information "store" is received, the storage information updating unit 413 may store the site server ID included in the received storage information in association with the user ID included in the received storage information in the storage information storage unit 422. Also, when storage information including the information "delete" is received, the storage information storage unit 422 may delete the site server ID included in the received storage information from the record corresponding to the user ID included in the received storage information.

Figure 8:
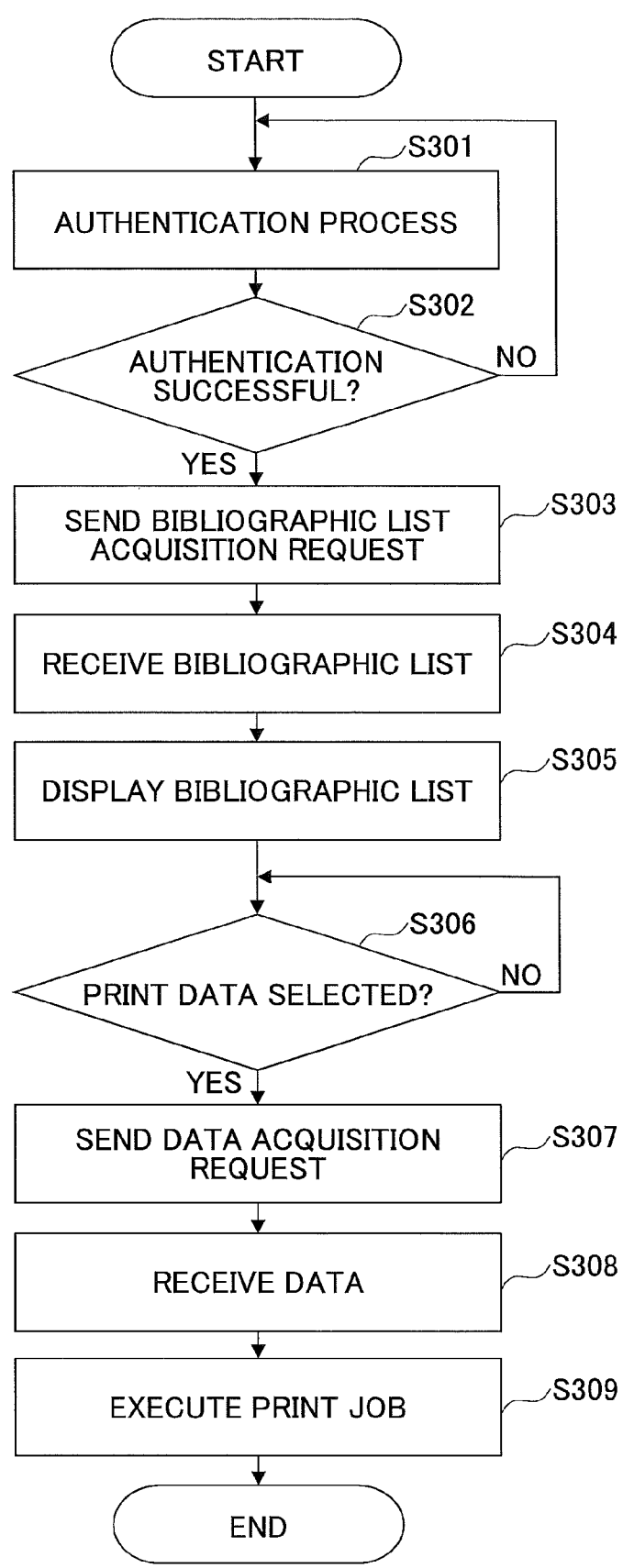
FIG. 8 is a flowchart illustrating exemplary process steps executed by an image forming apparatus in response to a user operation.

In the following, process steps that are executed in response to an operation of the image forming apparatus 20 by a user are described. FIG. 8 is a flowchart illustrating exemplary process steps executed by the image forming apparatus 20 in response to an operation of the image forming apparatus 20 by a user according to the present embodiment. Note that in the following descriptions of the process of FIG. 8, for convenience, process steps executed within site A are described as an example.

For example, a login screen may be displayed by an operation panel of the image forming apparatus 20a. When authentication information such as a user ID and a password is input by user A via the login screen, for example, the login control unit 23 performs an authentication process with respect to the authentication information (step S301). For example, the login control unit 23 may transmit an authentication request including the authentication information to the authentication relay unit 124 of the site server 10a. The authentication relay unit 124 forwards the authentication request to the authentication unit 411 of the management server 40. The authentication unit 411 executes an authentication process by comparing the authentication information included in the authentication request with authentication information stored in the user information storage unit 421. The result of the authentication process is returned to the login control unit 23 via the authentication relay unit 124.

If the authentication process is successful (YES in step S302), the list acquisition unit 24 specifies the user ID of the user that has been successfully authenticated by the authentication process (hereinafter referred to as "login user ID") in a bibliographic list acquisition request and transmits the bibliographic list acquisition request to the site server 10a (step S303). In response to such a request, the site server 10a returns a bibliographic list of bibliographic information associated with the login user ID to the image forming apparatus 20a. The list acquisition unit 24 receives the bibliographic list (step S304). Then, the display control unit 22 of the image forming apparatus 20a controls the operation panel of the image forming apparatus 20a to display a bibliographic list display screen including the received bibliographic list (S305). Note that the bibliographic list may include bibliographic information stored in the site server 10a as well as other site servers 10 that are located within other sites, for example.

When at least one item of bibliographic information is selected and a job execution instruction is input by user A via the bibliographic list display screen (YES in step S306), the data acquisition unit 25 of the image forming apparatus 20a transmits a print data acquisition request for print data associated with the file path name included in the selected bibliographic information to the IP address included in the selected bibliographic information (step S307). The print data acquisition request is received by the data management unit 129 of the site server 10 with the corresponding IP address. The data management unit 129 returns the print data identified by the file path name included in the print data acquisition request. The data acquisition unit 25 receives the returned print data (step S308). As described above, print data may be uniquely identified across multiple site servers 10 based on the address information of the print data, and in this way, the image forming apparatus 20a may be able to acquire print data from site servers 10 other than the site server 10*a*, for example. Note that in a case where print data and bibliographic information are to be automatically deleted when a print job for the print data is executed, the site server 10 may delete the print data returned in response to the print data acquisition request issued in step S307 and the corresponding bibliographic information of the print data from the storage unit 132 and the bibliographic information storage unit 131, and transmit corresponding storage information including the information "delete" to the management server 40.

Then, the job execution unit 26 of the image forming apparatus 20*a* controls the image forming apparatus 20*a* to execute a print job based on the acquired print data (step S309).

Figure 9:
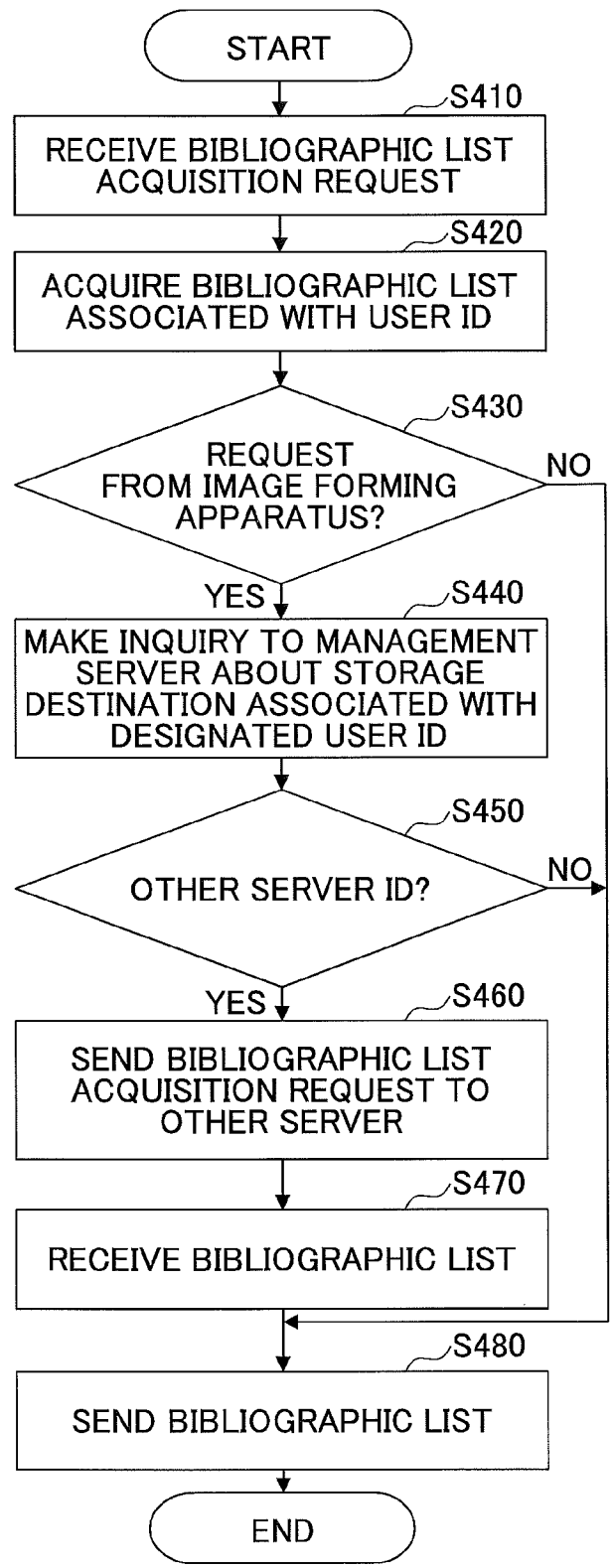
FIG. 9 is a flowchart illustrating exemplary process steps executed by the site server in response to a bibliographic list acquisition request according to the first embodiment.

In the following, process steps executed by the site server 10*a* in response to the bibliographic list acquisition request issued in step S303 are described. FIG. 9 is a flowchart illustrating exemplary process steps executed by the site server 10 in response to a bibliographic list acquisition request according to the present embodiment.

In step S410, the list request receiving unit 125 of the site server 10*a* receives a bibliographic list acquisition request. The bibliographic information gathering unit 127 of the site server 10*a* acquires bibliographic information including the user ID that is specified in the bibliographic list acquisition request from the bibliographic information storage unit 131 of the site server 10*a* (step S420). Then, the bibliographic information gathering unit 127 determines whether the sender of the bibliographic list acquisition request corresponds to the image forming apparatus 20*a* (step S430). Note that the sender of the bibliographic list acquisition request may be determined by referring to the IP address of the sender, for example.

If the sender of the bibliographic list acquisition request is the image forming apparatus 20*a* (YES in step S430), the storage destination inquiry unit 126 makes an inquiry about the storage destination of the bibliographic information associated with the user ID specified in the acquisition request to the management server 40 (step S440). For example, the storage destination inquiry unit 126 may transmit an inquiry request including the user ID to the management server 40. The storage destination response unit 414 of the management server 40 returns one or more site server IDs stored in the storage information storing unit 422 (FIG. 7) in association with the user ID specified in the inquiry request.

Then, the bibliographic information gathering unit 127 determines whether the returned site server IDs include a site server ID of a site server 10 other than the site server 10*a* (step S450).

If the returned site server IDs do not include a site server ID of another site server 10 (NO in step S450), the process proceeds to step S480. If the returned site server IDs include a site server ID of another site server 10 (YES in step S450), the bibliographic information gathering unit 127 specifies the user ID included in the acquisition request received in step S410 in a bibliographic list acquisition request and transmits the bibliographic list acquisition request to the other site server 10 with the site server ID identified in step S450 (step S460). Note that each site server 10 that receives such a bibliographic list acquisition request executes the process as illustrated in FIG. 9. In this case, a negative determination will be made in step S430. Accordingly, the other site server 10 that has received the bibliographic list acquisition request from the site server 10*a* returns a bibliographic list including bibliographic information stored in the bibliographic information storage unit 131 of the other site server 10 in association with the user ID specified in the bibliographic list acquisition request. In turn, the bibliographic information gathering unit 127 of the site server 10*a* receives the returned bibliographic list (step S470).

Then, the list response unit 128 returns the bibliographic list to the image forming apparatus 20*a* (step S480). Note that the bibliographic list returned to the image forming apparatus 20*a* may include the bibliographic list acquired in step S420, for example. Also, if step S460 is performed, the bibliographic list returned to the image forming apparatus 20*a* may also include the bibliographic list received in step S470.

As described above, according to an aspect of the present embodiment, association information associating each set of print data and corresponding bibliographic information with each user may be stored in a shared management server 40 that is provided with respect to a plurality of site servers (management server 40 shared by a plurality of site servers 10). Thus, a given site server 10 may make an inquiry to the management server 40 about the storage destination of bibliographic information that is associated with a login user of an image forming apparatus 20 to identify one or more storage destinations other than the given site server 10 and acquire bibliographic information from the corresponding storage destinations. As a result, the login user may be able to use bibliographic information and print data that are stored in a site server 10 belonging to a site other than the site where the login user is located. In this way, interoperability of bibliographic information and print data stored in the site servers 10 may be improved.

Also, according to an aspect of the present embodiment, the management server 40 stores association information associating a user with one or more site servers 10 but does not store bibliographic information and print data. In this way, the communication load between the site server 10 and the management server 40 may be reduced as compared with a case where bibliographic information and print data are centrally managed at the management server 40, for example.

Note that in the present embodiment, print data has been described as an example of data to be output by a device. However, the present embodiment is not limited thereto and may use other forms of data that can be stored in a storage apparatus and acquired from the storage apparatus by a device. For example, the present embodiment may be applied with respect to a plurality of projectors and image data to be projected by the projectors.

In the following, a second embodiment of the present invention is described. Note that in the following, features of the second embodiment that differ from those of the first embodiment are described. Thus, it may be assumed that features of the second embodiment that are not specifically mentioned below may be substantially similar to those of the first embodiment.

Figure 10:
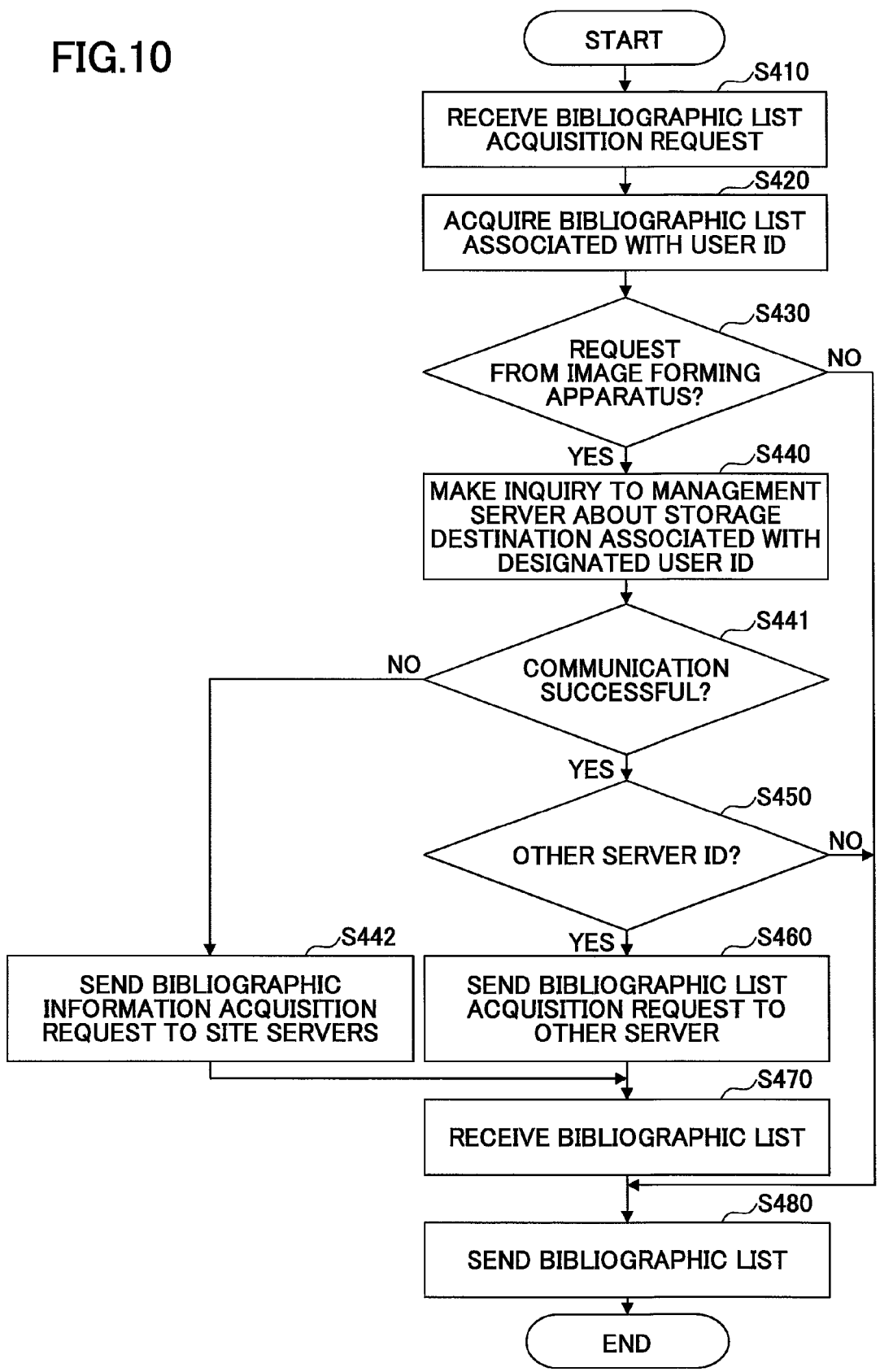
FIG. 10 is a flowchart illustrating exemplary process steps executed by the site server in response to a bibliographic list acquisition request according to a second embodiment of the present invention.

FIG. 10 is a flowchart illustrating exemplary process steps executed by the site server 10 in response to a bibliographic list acquisition request according to the second embodiment. Note that process steps of FIG. 10 that are identical to those of FIG. 9 are given the same reference numerals and their descriptions are omitted. In FIG. 10, steps S441 and S442 are added to the process steps of FIG. 9.

In step S441, the bibliographic information gathering unit 127 determines whether communication has been successfully established between the site server 10 and the management server 40 for making the inquiry in step S440. That is, a determination is made as to whether communication can be established with the management server 40.

If communication with the management server 40 cannot be established (NO in step S441), that is, if the storage information storage unit 422 of the management server 40 cannot be accessed, the bibliographic information gathering unit 127 transmits (e.g., broadcasts) a bibliographic information acquisition request for bibliographic information associated with the user ID specified in the bibliographic list acquisition request received in step S410 to all the other site servers 10 within the print system 1 (step S442). Then, in step S470, the bibliographic information gathering unit 127 receives relevant bibliographic information from one or more of the other site servers 10 having the relevant bibliographic information stored in its bibliographic information storage unit 131.

Note that address information of all the other site servers 10 may be set up in advance in each of the site servers 10, for example. Alternatively, address information of all the other site servers 10 may be set up in the management server 40, and each site server 10 may download the address information of all the other site servers 10 when it successfully establishes communication with the management server 40, for example.

As described above, according to an aspect of the second embodiment, even when communication cannot be established between the site server 10 and the management server 40, a print job based on print data stored in another site server 10 may still be executed.

Also, in some embodiments, each site server 10 may be configured to periodically download information stored in the storage information storage unit 422 of the management server 40 and identify a transmission destination of the bibliographic information acquisition request based on the downloaded information, for example. Note, however, that in this case, the information stored in the storage information storage unit 422 could potentially be updated after the site server 10 downloads the information from the management server 40 such that the information relied upon by the site server 10 upon transmitting the bibliographic information acquisition request may not always be current.

In the following, a third embodiment of the present invention is described. Note that in the following, features of the third embodiment that differ from those of the first or second embodiment are described. Therefore, it may be assumed that features of the third embodiment that are not specifically mentioned below may be substantially similar to the first or second embodiment.

In the third embodiment, in step S307 of FIG. 8, the data acquisition unit 25 of the image forming apparatus 20a specifies the IP address and the file path name included in the selected bibliographic information in a print data acquisition request and transmits the print data acquisition request to the site server 10a. That is, in the third embodiment, the data acquisition unit 25 of the image forming apparatus 20a transmits a print data acquisition request to the IP address of a predetermined site server 10a that is set up in advance in the image forming apparatus 20a instead of transmitting the print data acquisition request to the IP address included in the selected bibliographic information. In response to such a print data acquisition request, the site server 10a may execute process steps as illustrated in FIG. 11, for example.

Figure 11:
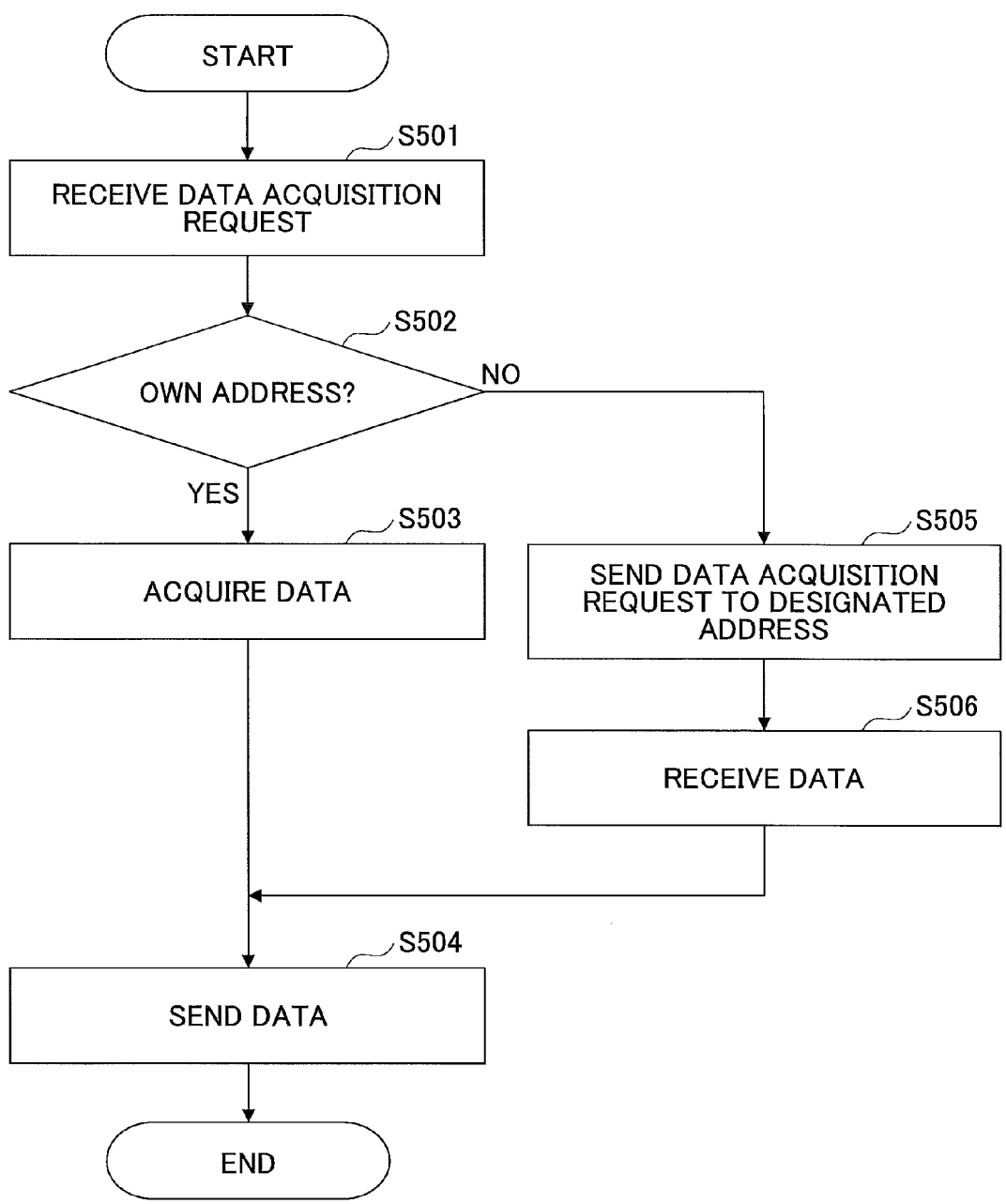
FIG. 11 is a flowchart illustrating exemplary process steps executed by the site server in response to a bibliographic list acquisition request according to a third embodiment of the present invention.

FIG. 11 is a flowchart illustrating exemplary process steps executed by the site server 10 in response to a print data acquisition request according to the third embodiment.

In step S501, the data management unit 129 receives a print data acquisition request. Then, the data management unit 129 determines whether the IP address specified in the received print data acquisition request corresponds to the IP address of the site server 10a, namely, its own IP address (step S502). If the IP address specified in the received print data acquisition request corresponds to the IP address of the site server 10a (YES in step S502), the data management unit 129 acquires print data associated with the file path name specified in the print data acquisition request from the data storage unit 132 of the site server 10a (step S503). Then, the data management unit 129 transmits the acquired print data to the sender of the print data acquisition request (step S504).

On the other hand, if the IP address specified in the received print data acquisition request does not correspond to the IP address of the site server 10a (NO in step S502), the data management unit 129 transmits a print data acquisition request to the specified IP address (step S505). In turn, the site server 10 that receives the print data acquisition request from the site sever 10a executes the process steps illustrated in FIG. 11. As a result, the data management unit 129 of the site server 10a receives the relevant print data from the site server 10 (step S506). Then, the data management unit 129 of the site server 10a transmits the received print data to the sender of the print data acquisition request (step S504).

As described above, according to an aspect 20, of the third embodiment, the site server 10 may be restricted from accessing an image forming apparatus 20 located at another site. In other words, the image forming apparatus 20 is configured to acquire print data to be used for executing a print job via the site server 10 provided at the same site as the image forming apparatus 20. In this way, security measures may be improved with respect to the site servers 10, for example.

Note that in some embodiments, a selection may be made between implementing the third embodiment and implementing the first or second embodiment by adjusting the setting of the image forming apparatus 20, for example.

In the following, a fourth embodiment of the present invention is described. Note that the fourth embodiment may be implemented in combination with the first to third embodiments. The fourth embodiment relates to utilizing the information stored in the storage information storing unit 422 of the management server 40.

Figure 12:
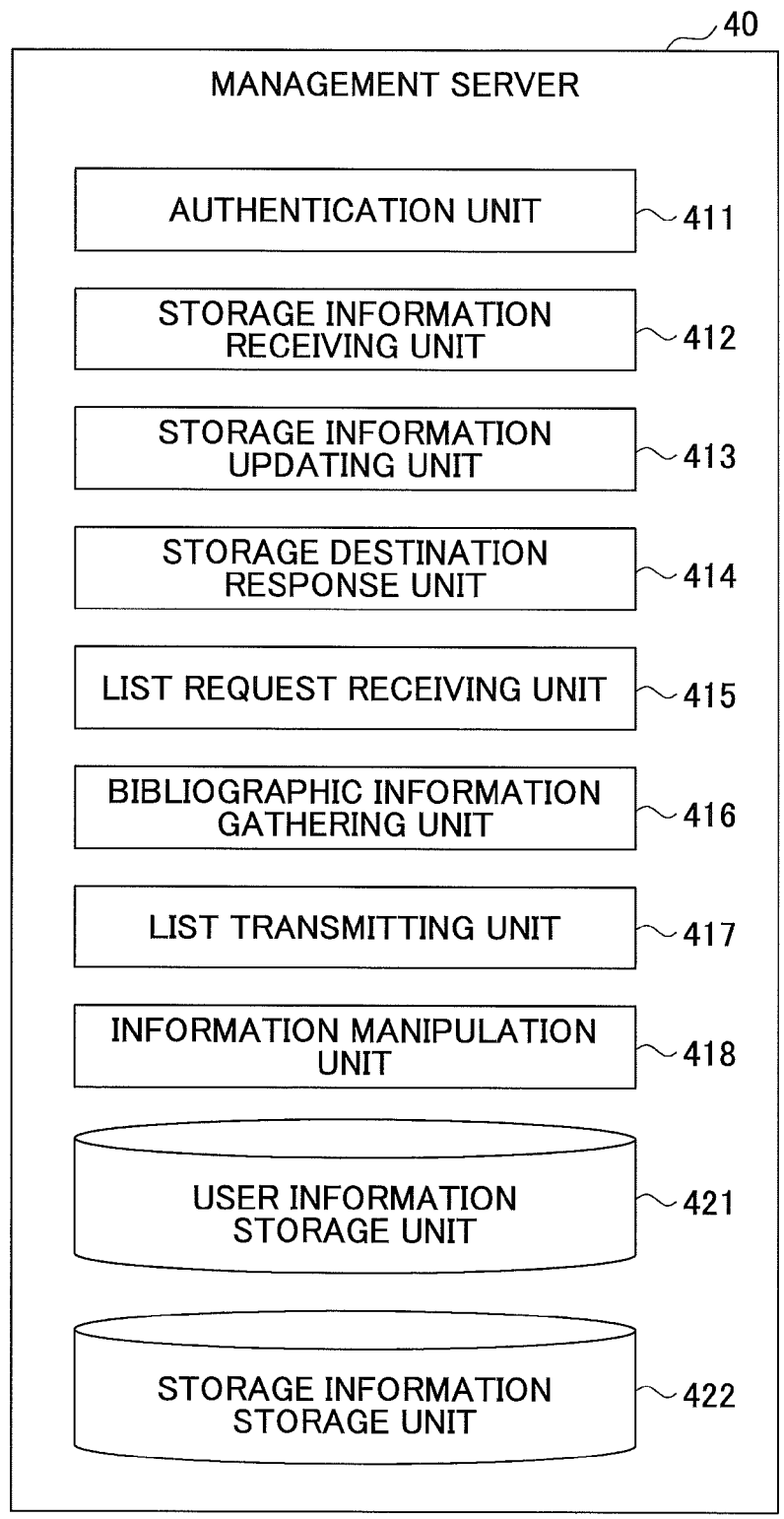
FIG. 12 illustrates an exemplary functional configuration of the management server according to a fourth embodiment of the present invention.

FIG. 12 illustrates an exemplary functional configuration of the management server 40 according to the fourth embodiment. Note that functional elements illustrated in FIG. 12 that are identical to those illustrated in FIG. 3 are given the same reference numerals and their descriptions are omitted.

In FIG. 12, the management server 40 further includes a list request receiving unit 415, a bibliographic information gathering unit 416, a list transmitting unit 417, and an information manipulation unit 418.

The list request receiving unit 415 receives a bibliographic list acquisition request from the user PC 30. That is, in the fourth embodiment, the user PC 30 located at a given site is able to access the management server 40. The bibliographic information gathering unit 416 gathers bibliographic information associated with the user specified in the bibliographic list acquisition request from the relevant site servers 10. The list transmitting unit 417 transmits a bibliographic list of the gathered bibliographic information to the user PC 30 corresponding to the sender of the bibliographic list acquisition request. The information manipulation unit 418 executes a relevant process with respect to bibliographic information or print data according to a request from the user PC 30.

Figure 13:
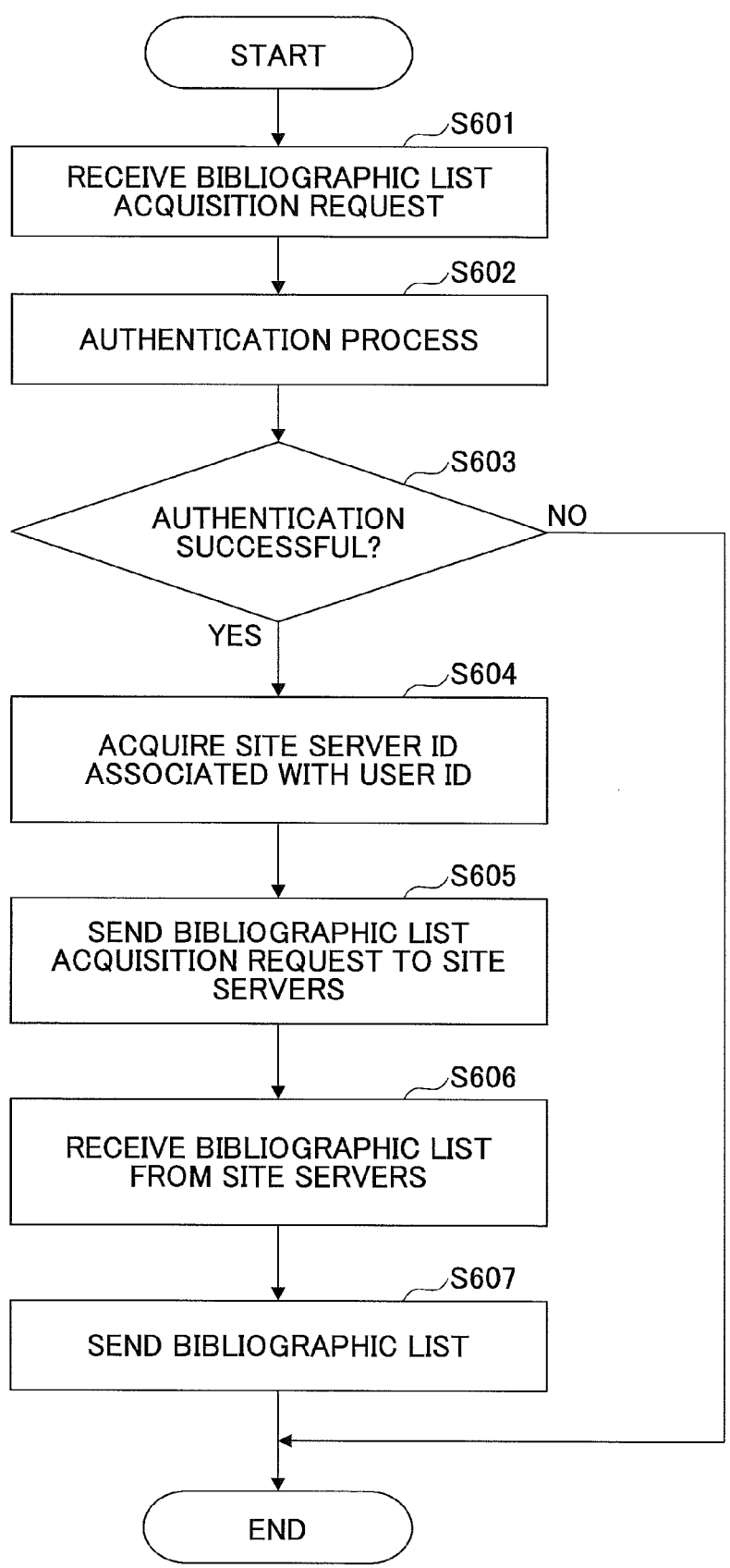
FIG. 13 is a flowchart illustrating exemplary process steps executed by the site server in response to a bibliographic list acquisition request according to the fourth embodiment.

FIG. 13 is a flowchart illustrating exemplary process steps executed by the management server in response to a bibliographic list acquisition request according to the fourth embodiment.

In step S601, the list request receiving unit 415 of the management server 40 receives a bibliographic list acquisition request from a user PC 30 located within a given site. The bibliographic list acquisition request from the user PC 30 includes authentication information such as a user ID and a password of the user operating the user PC 30. Then, the authentication unit 411 executes an authentication process by comparing the authentication information included in the bibliographic list acquisition request with the authentication information stored in the user information storage unit 421 (step S602).

If the authentication process is successful (YES in step S603), the bibliographic information gathering unit 416 acquires one or more site server IDs stored in the storage information storage unit 422 in association with the user ID of the user operating the user PC 30 (hereinafter referred to as "login user ID") (step S604). Then, the bibliographic information gathering unit 416 specifies the login user ID in a bibliographic list acquisition request and transmits the bibliographic list acquisition request to one or more site servers 10 that are identified by the acquired site server IDs (step S605). Each site server 10 that receives the bibliographic list acquisition request from the bibliographic information gathering unit 416 executes the process illustrated in FIG. 9. In this way, a bibliographic list including bibliographic information associated with the login user ID may be transmitted to the bibliographic information gathering unit 416 from each of the site servers 10 corresponding to the transmission destination of the bibliographic list acquisition request. The bibliographic information gathering unit 416 receives the bibliographic list from the site servers 10 (step S606). Then, a list transmitting unit 417 transmits a bibliographic list including the bibliographic lists gathered by the bibliographic information gathering unit 416 to the user PC 30 (step S607).

The user PC 30 that receives the bibliographic list from the list transmitting unit 417 may display the received bibliographic list, for example. When any kind of manipulation instruction (e.g., delete instruction) with respect to any of the bibliographic information items included in the displayed bibliographic list is input by the login user, the user PC 30 transmits the manipulation instruction with respect to the relevant bibliographic information to the management server 40. The information manipulation unit 418 of the management server 40 forwards the manipulation instruction to the relevant site server 10 with the IP address included in the relevant bibliographic information. The data management unit 129 of the relevant site server 10 executes a relevant process according to the manipulation instruction. For example, the data management unit 129 may delete the bibliographic information that is subject to the manipulation instruction and the corresponding print data associated with the bibliographic information from the bibliographic information storage unit 131 and the data storage unit 132.

As described above, according to an aspect of the fourth embodiment, information distributed across multiple site servers 10 may be consolidated based on information stored in the storage information storage unit 422 of the management server 40 and the consolidated information may be provided to the user PC 30.

Note that in the above-described embodiments, the site server 10 is an example of an information processing apparatus. The management server 40 is an example of a storage apparatus. The print data is an example of output data. The data receiving unit 121 is an example of a receiving unit. The bibliographic information storage unit 131 and the data storage unit 132 are examples of a storage unit. The bibliographic information gathering unit 127 is an example of an information acquisition unit. The list transmitting unit 128 is an example of a first transmitting unit. The user ID is an example of user identification information. The data management unit 129 is an example of a second transmitting unit. The storage information transmitting unit 123 is an example of a third transmitting unit.

Although the present invention has been described above with reference to certain illustrative embodiments, the present invention is not limited to these embodiments, and numerous variations and modifications may be made without departing from the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2014-104950 filed on May 21, 2014, the entire contents of which are hereby incorporated by reference.

What is claimed is:

1. An information processing system comprising:
   a plurality of information processing apparatuses, each including a first processor and a first memory; and
   a management apparatus including a second processor and a second memory;
   wherein the first memory is configured to store output data and user identification information;
   wherein the second memory is configured to store storage information associating user identification information of a user with identification information of each information processing apparatus from among the plurality of information processing apparatuses;
wherein the first processor is configured to
store, in the first memory, the output data and the user identification information, which identifies a user allowed to output the stored output data;
transmit the user identification information of the user allowed to output the stored output data to the management apparatus; and
transmit the stored output data to an output device; and
wherein the second processor is configured to
register, in the storage information, the user identification information sent by the first processor and the identification information of a first information processing apparatus from among the plurality of information processing apparatuses sending the user identification information;
manage, based on the storage information, each information processing apparatus in combination with the user allowed to output the stored output data; and
transmit a list to the first information processing apparatus, the list being generated based on the managed combination, and including the identification information of each information processing apparatus from among the plurality of information processing apparatuses for the user outputting the output data at the output device, each information processing apparatus in the list storing the output data, which the user at the output device is allowed to output, wherein the second processor does not manage a combination of each output data and the user allowed to output the output data; and
the output device outputs the output data transmitted from the information processing apparatus based on the list, and
wherein in response to a determination by the first processor of the first information processing apparatus that the list transmitted from the management apparatus includes the identification information of a second information processing apparatus, other than the first information processing apparatus, from among the plurality of information processing apparatuses, the first information processing apparatus
transmits a request for storage information associated with the user identification information to the second information processing apparatus, and
receives the storage information associated with the user identification information from the second information processing apparatuses where the storage information associated with the user identification information is stored.

2. The information processing system as claimed in claim 1, wherein the second processor is further configured to:
execute a deletion process that deletes, from the storage information in the second memory, one set of the associated user identification information of the user and identification information of the information processing apparatus corresponding to the combination of the information processing apparatus and the user when the information processing apparatus in the set no longer stores any output data, which the user in the set is allowed to output, and wherein
the second processor does not execute the deletion process unless the information processing apparatus no longer stores any output which the one user is allowed to output.

3. The information processing system as claimed in claim 2, wherein the second processor is further configured to
determine whether the combination of the user identification information sent by the first processor and the identification information of the information processing apparatus sending the user identification information is included in the storage information, and
wherein the second processor registers the user identification information sent by the first processor and the identification information of the information processing apparatus sending the user identification information as a new record in the storage information when the determining determines that the combination is not included in the storage information.

4. The information processing system according to claim 1, wherein the first processor determines whether communication with the management apparatus is established, and upon determining that communication with the management apparatus has not been established, the first processor
transmits a request for storage information associated with the user identification information of the user allowed to output the stored output data to the other information processing apparatuses of the plurality of information processing apparatuses, and
receives the storage information associated with the user identification information from the other information processing apparatuses where the storage information associated with the user identification information is stored.

5. The information processing system according to claim 1, wherein address information of the other information apparatuses is obtained from the management apparatus during periods where communication with the management apparatus is successfully established.

6. An information processing apparatus comprising:
a connection interface configured to establish connection with a management apparatus that stores storage information associating user identification information of a user with identification information of a plurality of information processing apparatuses;
a memory configured to store the output data and user identification information; and
a processor configured to
store in the memory, the output data and the user identification information the user allowed to output the output data; and
transmit, to the management apparatus, the user identification information of the user allowed to output the stored output data; and
transmit the stored output data for outputting the output data at an output device, and
receive a list from the management apparatus that includes the identification information of each information processing apparatus from among the plurality of information processing apparatuses for the user outputting the output data at the output device, each information processing apparatus in the list storing the output data, which the user at the output device is allowed to output,
wherein in response to a determination by the processor that the list transmitted from the management apparatus includes the identification information of another information processing apparatus from among the plurality of information processing apparatuses, the processor
transmits a request for storage information associated with the user identification information to the other information processing apparatus, and receives the storage information associated with the user identification information from the other information processing apparatus where the storage information associated with the user identification information is stored.

7. The information processing apparatus according to claim 6, wherein the processor determines whether communication with the management apparatus is established, and upon determining that communication with the management apparatus has not been established, the processor
   transmits a request for storage information associated with the user identification information of the user allowed to output the stored output data to the other information processing apparatuses of the plurality of information processing apparatuses, and
   receives the storage information associated with the user identification information from the other information processing apparatuses where the storage information associated with the user identification information is stored.

8. The information processing apparatus according to claim 6, wherein address information of the other information apparatuses is obtained from the management apparatus during periods where communication with the management apparatus is successfully established.

9. An information processing method implemented by an information processing system including a plurality of information processing apparatuses, each including a first processor and a first memory that is configured to store output data and user identification information, and a management apparatus that includes a second processor and a second memory, the information processing method comprising:
   storing in the second memory, storage information associating user identification information of a user with identification information of each information processing apparatus from among the plurality of information processing apparatuses;
   causing the first processor to implement processes of
      storing the output data and the user identification information, which identifies a user allowed to output the stored output data;
      transmit the user identification information of the user allowed to output the stored output data to the management apparatus;
      transmitting the stored output data to an output device; and
   causing the second processor to implement processes of
      registering, in the storage information, the user identification information sent by the first processor and the identification information of a first information processing apparatus from among the plurality of information processing apparatuses sending the user identification information;
      managing, based on the storage information, each one information processing apparatus in combination with the user allowed to output the stored output data; and
      transmitting a list to the first information processing apparatus, the list being generated based on the managed combination, and including the identification information of each information processing apparatus from among the plurality of information processing apparatuses for the user outputting the output data at the output device, each information processing apparatus in the list storing the output data which the user at the output device is allowed to output, wherein
         the second processor does not manage a combination of each output data and the user allowed to output the output data; and
         the output device outputs the output data transmitted from the information processing apparatus based on the list, and
      wherein in response to a determination by the first processor of the first information processing apparatus that the list transmitted from the management apparatus includes the identification information of a second information processing apparatus, other than the first information processing apparatus, from among the plurality of information processing apparatuses, the first information processing apparatus
         transmits a request for storage information associated with the user identification information to the second information processing apparatus, and
         receives the storage information associated with the user identification information from the second information processing apparatuses where the storage information associated with the user identification information is stored.

10. The information processing method implemented by the information processing system including the plurality of information processing apparatuses according to claim 8, the information processing method further comprising:
    deleting the storage information associating the user identification information with the identification information when the information processing apparatus identified by the deleted identification information does not store the output data associated with the user identified by the deleted user identification information;
    wherein the first processor included in the information processing system is configured to determine whether there is no output data associated with one user among the output data stored in one of the plurality of information processing apparatuses by deleting the stored output data in response to execution of the deletion process, and
    wherein the second processor is configured delete the storage information based on the determination.

11. The information processing method according to claim 9, wherein the first processor further determines whether communication with the management apparatus is established, and upon determining that communication with the management apparatus has not been established, the first processor
    transmits a request for storage information associated with the user identification information of the user allowed to output the stored output data to the other information processing apparatuses of the plurality of information processing apparatuses, and
    receives the storage information associated with the user identification information from the other information processing apparatuses where the storage information associated with the user identification information is stored.

12. The information processing method according to claim 9, further comprising:
    obtaining, by the first processor, address information of the other information apparatuses from the management apparatus during periods where communication with the management apparatus is successfully established.

13. A management apparatus comprising:
    an interface configured to connect a plurality of information processing apparatus via a network, the information processing apparatus storing output data and user identification information of a user who is allowed to output the output data;

a memory configured to store storage information associating the user identification information with identification information of each information processing apparatus from among the plurality of information processing apparatuses; and a processor configured to
register, in the storage information, the user identification information sent by the first processor and the identification information of a first information processing apparatus from among the plurality of information processing apparatuses sending the user identification information;

manage, based on the storage information, each information processing apparatus in combination with the user who has the output data allowed to output and stored in the one information processing apparatus; and transmit a list to the first information processing apparatus, the list being generated based on the managed combination, and including the identification information of each information processing apparatus from among the plurality of information processing apparatuses for the user outputting the output data at an output device, each information processing apparatus in the list storing the output data, which the user at an output device is allowed to output, wherein
the processor does not manage a combination of each output data and the user who is allowed to output the output data, the information processing apparatus transmits the stored output data for outputting the output data at the output device, and the output device outputs the output data transmitted from the information processing apparatus based on the list; and wherein in response to a determination by the first processor of the first information processing apparatus that the list transmitted from the management apparatus includes the identification information of a second information processing apparatus, other than the first information processing apparatus, from among the plurality of information processing apparatuses, the first information processing apparatus transmits a request for storage information associated with the user identification information to the second information processing apparatus, and receives the storage information associated with the user identification information from the second information processing apparatuses where the storage information associated with the user identification information is stored.

14. The management apparatus as claimed in claim 13, wherein the processor is further configured to:

execute a deletion process to delete, from the storage information in the second memory, one set of the associated user identification information of the user and identification information of the information processing apparatus corresponding to the combination of the information processing apparatus and the user when the information processing apparatus in the set no longer stores any output data, which the user in the set is allowed to output, and wherein the processor does not execute the deletion process unless the information processing apparatus no longer stores any output which the one user is allowed to output.

15. The management apparatus as claimed in claim 13, wherein the processor is further configured to:

determine whether the combination of the user identification information sent by the information processing apparatus and the identification information of the information processing apparatus sending the user identification information is included in the storage information, and wherein the processor registers the user identification information sent by the information processing apparatus and the identification information of the information processing apparatus sending the user identification information as a new record in the storage information when the determining determines that the combination is not included in the storage information.

16. The management apparatus as claimed in claim 13, wherein, in a case where the management apparatus cannot establish communication with the information processing apparatus, the information processing apparatus transmits a request for storage information associated with the user identification information of the user allowed to output the stored output data to the other information processing apparatuses of the plurality of information processing apparatuses, and receives the storage information associated with the user identification information from the other information processing apparatuses where the storage information associated with the user identification information is stored.

17. The management apparatus as claimed in claim 13, wherein the processor is further configured to:

transmit address information of the other information apparatuses to the information processing apparatus during periods where communication with the information processing apparatus is successfully established.

* * * * *